Aug. 8, 1961  E. G. OBERG  2,995,158
COIN-OPERATED MILK SHAKE VENDING MACHINE
Filed April 6, 1959  7 Sheets-Sheet 1

Fig. 1

INVENTOR.
Elliot G. Oberg
BY
Attorneys

Aug. 8, 1961  E. G. OBERG  2,995,158
COIN-OPERATED MILK SHAKE VENDING MACHINE
Filed April 6, 1959  7 Sheets-Sheet 2

INVENTOR:
Elliot G. Oberg
BY
Attorneys

Aug. 8, 1961 E. G. OBERG 2,995,158
COIN-OPERATED MILK SHAKE VENDING MACHINE
Filed April 6, 1959 7 Sheets-Sheet 4

INVENTOR.
Elliot G. Oberg
BY
Attorneys

Aug. 8, 1961 E. G. OBERG 2,995,158
COIN-OPERATED MILK SHAKE VENDING MACHINE
Filed April 6, 1959 7 Sheets-Sheet 5

INVENTOR.
Elliot G. Oberg
BY
Attorneys

Aug. 8, 1961 E. G. OBERG 2,995,158
COIN-OPERATED MILK SHAKE VENDING MACHINE
Filed April 6, 1959 7 Sheets-Sheet 6

INVENTOR.
Elliot G. Oberg
BY
Attorneys

329# United States Patent Office 2,995,158
Patented Aug. 8, 1961

2,995,158
COIN-OPERATED MILK SHAKE VENDING MACHINE
Elliot G. Oberg, P.O. Box 144, Guerneville, Calif.
Filed Apr. 6, 1959, Ser. No. 804,525
6 Claims. (Cl. 141—69)

This invention relates generally to vending machines and is concerned more particularly with the selective making and vending of an ice cream drink, such as a milk shake, at the choice of a customer. This is a continuation-in-part of my previously filed application Serial No. 646,872, filed March 18, 1957, now abandoned.

The problems solved by the present invention are those arising from the necessity of mixing a hard solid, such as frozen ice cream, with various liquid ingredients such as milk, flavoring, etc., in the making of an ice cream drink. The problems arise from the fact that a small portion of ice cream must be removed from a larger quantity and be placed in a suitable container along with the liquid milk and the flavoring ingredients. The liquid and solid ingredients must then be thoroughly dispersed and agitated to provide a smooth, palatable ice cream drink. These various operations normally require a considerable expenditure of time and energy, even when performed by a skilled soda fountain operator, and have not heretofore been considered adaptable to vending machine operations.

The present invention provides for the first time a machine which is capable of dispensing all the ingredients normally employed in the making of an ice cream drink, as a milk shake, and provides means for quickly mixing and blending the solid ice cream with the liquid milk and flavoring ingredients. It provides for the first time a machine of this character featuring completely hygienic storing and mixing of the ingredients, in measured quantities, to permit the vending of a complete and sanitary milk shake. It provides for the first time a simple economical device adapted to coin operation, by which an ice cream drink can be made available to the public at all hours and at any desired location. It provides for the first time such a machine which avoids the use of complicated or expensive parts, and which can be easily and inexpensively manufactured from materials and parts which are standard in character and readily available. Because of these many advantages, an economical machine of excellent operating efficiency and usefulness is now possible, whereas such a machine has not previously existed.

Other objects and advantages in addition to the above will be apparent from the following description of a preferred embodiment of the machine, as illustrated in the accompanying drawing in which.

In general, the vending machine of the present invention operates in conjunction with a waxed paper cup which is adapted to be moved through the various dispensing and mixing operations performed by the machine. The machine includes a refrigerated housing enclosing a plurality of containers for cups, ice cream, milk and flavoring ingredients, a mixing deivce movably mounted within the housing, a power source for operating and moving the mixing device, dispensing means associated with each of said containers, and a movable carriage which includes a cup receptacle. The machine performs the operations of dispensing a cup into the carriage, dispensing ice cream into the cup, dispensing milk and flavoring into the cup, and thoroughly mixing the various ingredients to provide the completed "milk shake" or similar ice cream drink, all in response to the particular choice of the customer. The machine also operates to maintain the various ingredients at all times completely sanitary and refrigerated.

The preferred embodiment of the machine illustrated in the drawings comprises an outer insulated cabinet 10, within which the mechanism forming the subject matter of my invention is arranged. The cabinet 10 provides a mounting for means forming various operating stations in the machine including a cup-dispensing station 12, an ice cream dispensing station 14, a milk dispensing station 16, various flavor dispensing stations 18, and a mixing station 20. Movable beneath each of these stations is a carriage 22 including a receptacle for a cup. Selector mechanisms are associated with each of the dispensing stations and the mixing station to permit the dispensing of all the ingredients into a cup, and the mixing necessary for the making of a vendable milk shake. Coin actuated means 24, having a coin slot 26, permits actuation of all the associated stations and mechanisms for the purpose described.

The refrigeration system of the machine includes a blower 28 including a suitable source of power such as electric motor 30, and the customary refrigeration unit including cooling coils 32 (housed within the duct 34 for the blower) and a compressor, condensor and expansion valve (not shown). As refrigeration units of this type are conventional in the vending art, further description is omitted.

Figure 1:
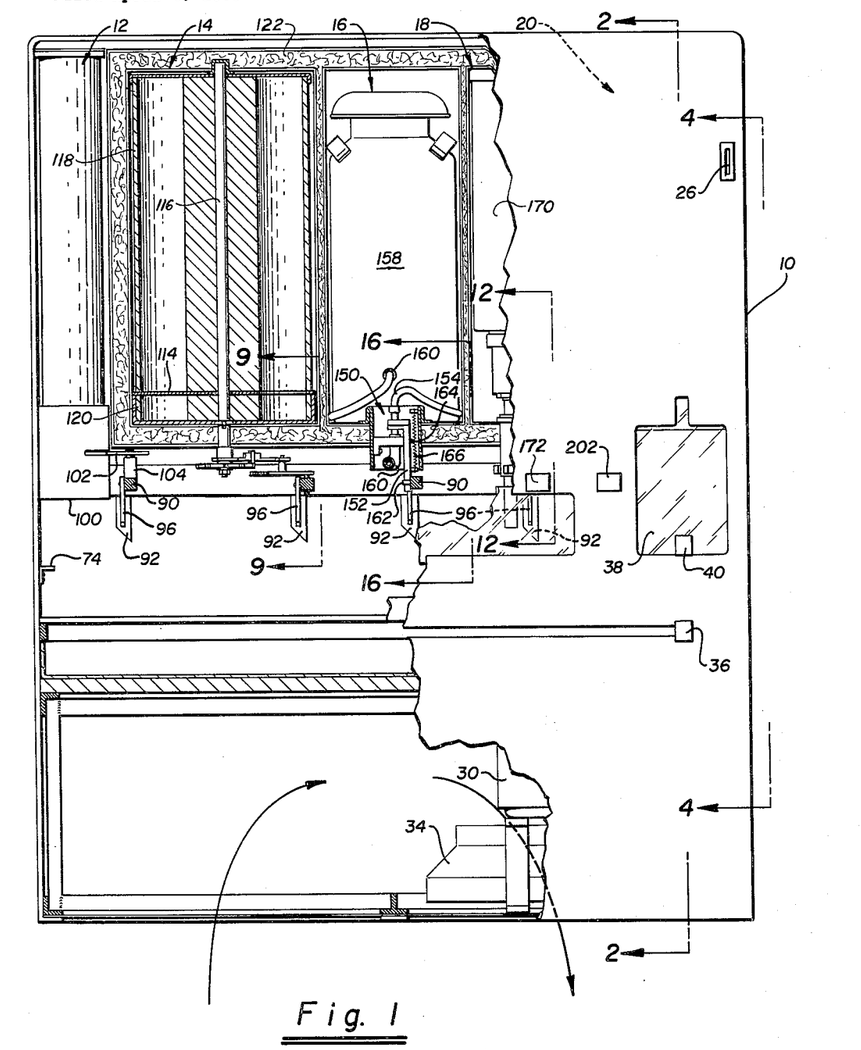
FIGURE 1 is a view in front elevation and section of the machine.

Briefly the machine operates on insertion of a coin in the slot 26 to release the carriage so that it can be moved automatically or by means of the handle 36 to a position below the cup dispensing station 12. A cup can then be dispensed into the receptacle of the carriage and the carriage moved successively beneath the ice cream dispensing station 14, milk dispensing station 16, and flavor dispensing stations 18, to receive the desired ingredients. Mixing can now be performed in automatic timed relation at the mixing station 20, and the completed milk shake removed through the sliding glass door 38, which is operable by the handle 40 (note FIGURES 1 and 2).

Figures 2, 3, 15:
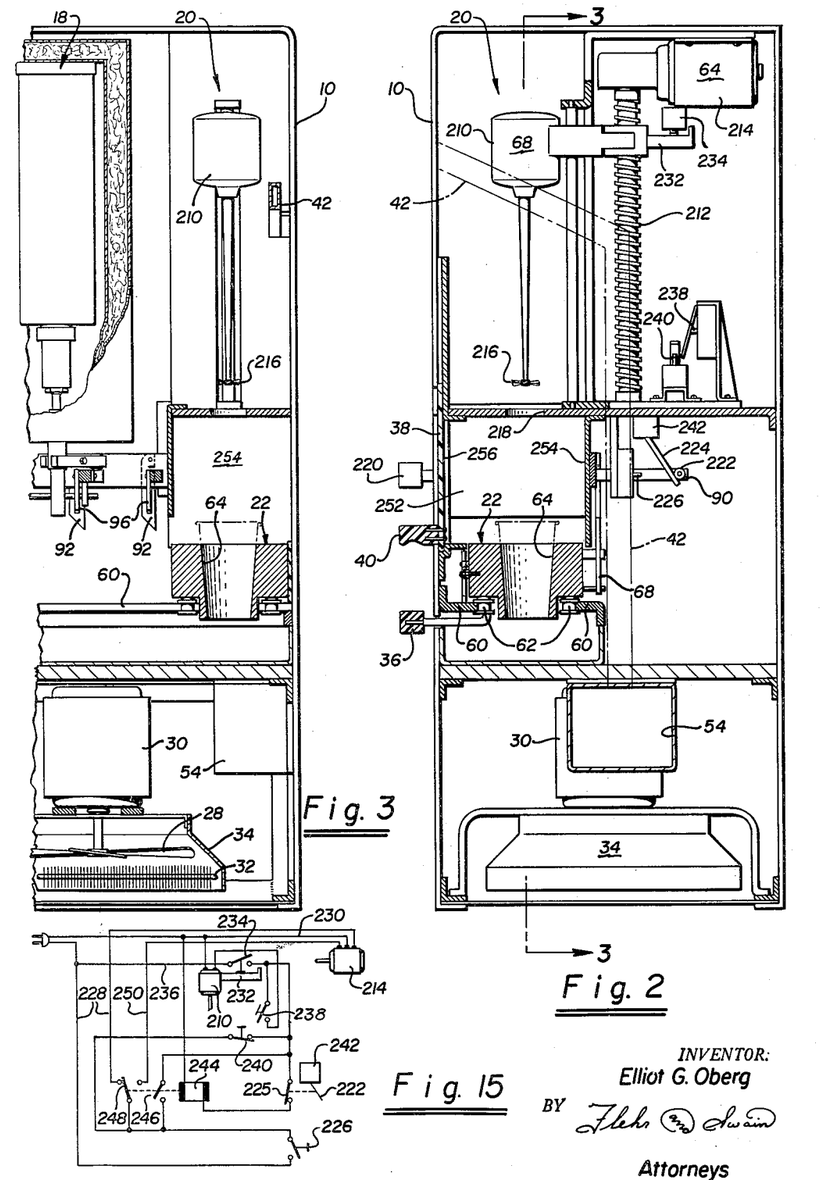
FIGURE 2 is a sectional view through the machine along the line 2—2 of FIGURE 1.
FIGURE 3 is a like view along the line 3—3 of FIGURE 2.
FIGURE 15 is a schematic representation of the control circuit for the mixing station.
Figures 4, 5, 6, 7, 8:
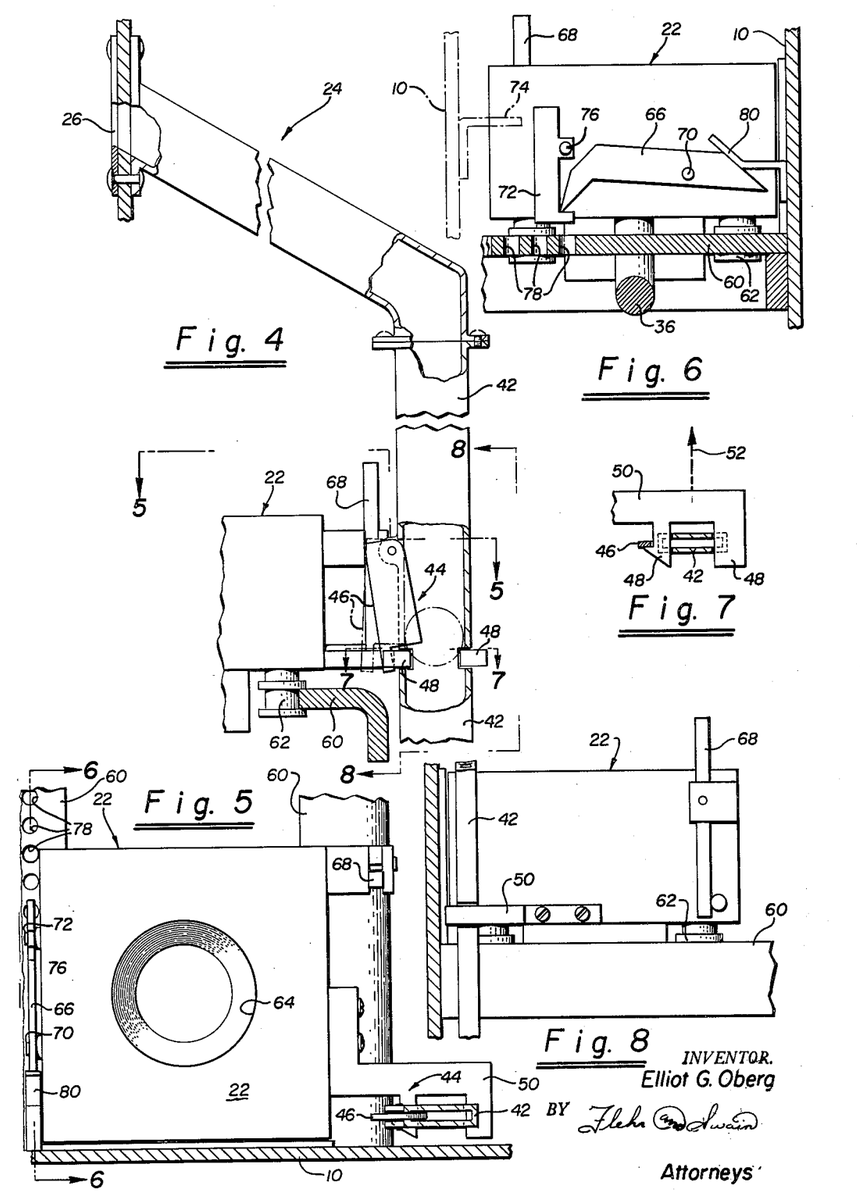
FIGURE 4 is a detail view, along the line 4—4 of FIGURE 1, showing features of the coin-actuated mechanism.
FIGURE 5 is a view in horizontal section along the line 5—5 of FIGURE 4.
FIGURE 6 is a vertical section along the line 6—6 of FIGURE 5.
FIGURE 7 is a horizontal section along the line 7—7 of FIGURE 4.
FIGURE 8 is a vertical section along the line 8—8 of FIGURE 4.

*Coin actuation (FIGURES 4–8).*—The coin actuating mechanism 24 includes the coin slot 26, coin chute 42 and coin operated carriage lock, indicated generally at 44 (FIGURES 4 and 5). The carriage lock includes a gravity actuated locking lever 46 which is adapted to interlock with one of the prongs 48 of an arm 50 secured to the cup holding carriage 22 (FIGURES 5 and 7). The coin chute 42 is cut away so as to receive both the prongs 48 and the locking lever 46 (FIGURE 4). In use, a coin of proper size and weight passing down the chute will cause the lever 46 to rock clockwise as viewed in FIGURE 4, to disengage the arm 50. This releases the carriage 22 for movement by the handle 40 in the direction indicated by the arrow 52 (FIGURE 7). Prior to such movement, the coin will be retained in the coin chute by the prongs 48. However, upon movement of the carriage away from the coin chute, the coin will be free to pass down through the chute to the coin box 54 (FIGURE 2).

As will be later described, return of the carriage to its final position, for the dispensing of a milk shake, will again cause the lever 46 to interlock with arm 50 until actuation of the coin mechanism 24 by insertion of another coin.

*The carriage mechanism (FIGURES 2, 3, 6 and 14).*— The carriage 22 is mounted for lateral sliding movements within the cabinet 10 by means of the rails 60 and roller supports 62. In the preferred embodiment illustrated, the carriage is adapted to be moved manually by the handle 36. Means are provided which permit free movement of the carriage laterally to a position under the cup dispensing station, but which directionally restrict return movement of the carriage.

The carriage is provided with a suitable cup receptacle 64 and is provided with a directional pawl 66 and a directional trip lever 68. The directional pawl 66 is pivoted on the carriage at 70 and is normally held in a disengaged position by the gravity lock 72 (FIGURE 6). In this position of the pawl, the carriage 22 is free to move from a position adjacent the coin chute to its first operating position below the cup dispensing station 12 (to the left as viewed in FIGURE 1). Upon reaching the latter position, the gravity lock 72 is released by contact with the stop 74 which acts to pivot the lock in a clockwise direction about its pivot support 76. The pawl 66 now pivots counterclockwise into engagement with the forward rail 60. The latter is provided with a series of apertures 78 which function as a ratchet to permit subsequent movements of the carriage only in a return path (i.e. to the right) through the various operating stations of the machine. Upon return of the carriage to its original position, the pawl release 80 functions to lift the pawl from the rail and permit the gravity lock 72 to again swing into the locking position illustrated in FIGURE 6. The carriage is now ready for the next cycle of operations.

Movement of the carriage 22 through a cycle of operations, as just described, also causes the directional trip lever 68 to release the various selector mechanisms, as will be presently explained.

*The selector mechanisms (FIGURES 1, 9, 12 and 14).*—Each of the operating stations is provided with a selector mechanism including an actuating pull rod 90. Each of these rods is adapted to longitudinal sliding movements transversely of the machine, but is normally locked against outward movement by a pivoted gravity lock 92 which is adapted to swing into a recess or notch 94 provided in one side of the lock (left hand position FIGURE 14).

Upon movement of the carriage 22 to the left, to initiate an operating cycle, the directional trip lever 68 functions to pivot the locks 92 out of the notches 94, thereby freeing the various actuating rods for outward movement. To insure that the gravity locks 92 will thereafter remain in released position, each actuating rod is additionally provided with a pivoted gravity catch 96, which upon release of a lock 92 pivots into position to hold the lock in released position. This function will be evident from either FIGURE 9 or FIGURE 12.

Figure 9:
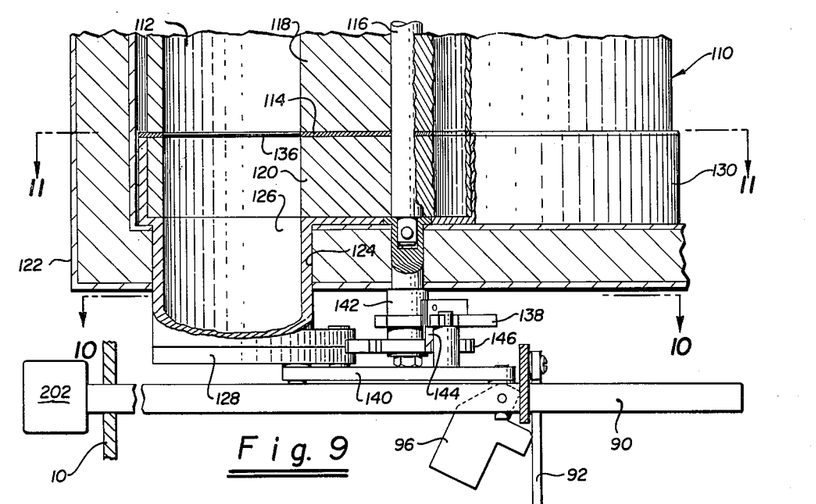
FIGURE 9 is a detail view along the line 9—9 of FIGURE 1, showing a portion of the ice cream dispensing mechanism.
Figures 12, 13:
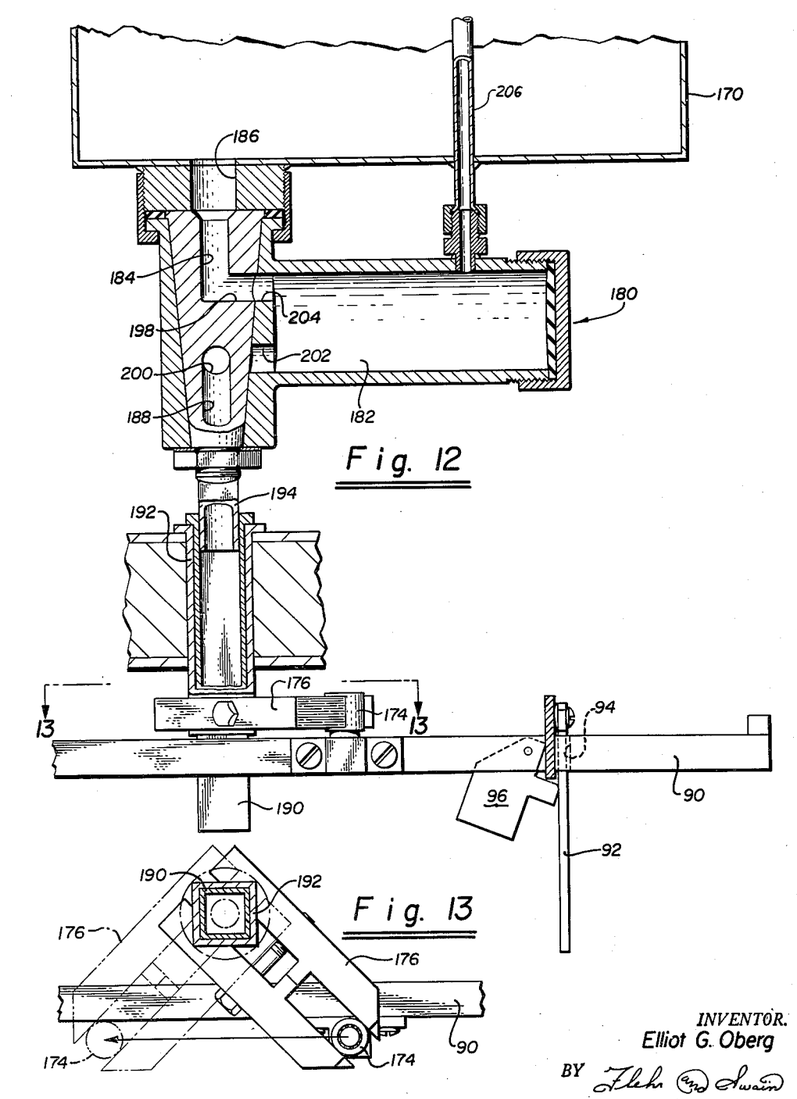
FIGURE 12 is a detail view in section along the line 12—12 of FIGURE 1, showing one form of a flavor dispensing mechanism.
FIGURE 13 is a view in horizontal section along the line 13—13 of FIGURE 12.

Upon subsequent longitudinal movement of an actuating rod 90, in response to customer selection, the gravity lock 92 is free to ride on the edge of the rod until such time as the rod has been pushed inward to complete the selection. The catch 96 being pivoted on the rod will travel with the rod during such movements, and consequently will be immediately disengaged from the gravity lock 92. It will be understood that as a rod 90 is pushed inward to complete a selection, the gravity lock will fall into the notch 94, causing the catch element to assume its original released position.

Figure 14:
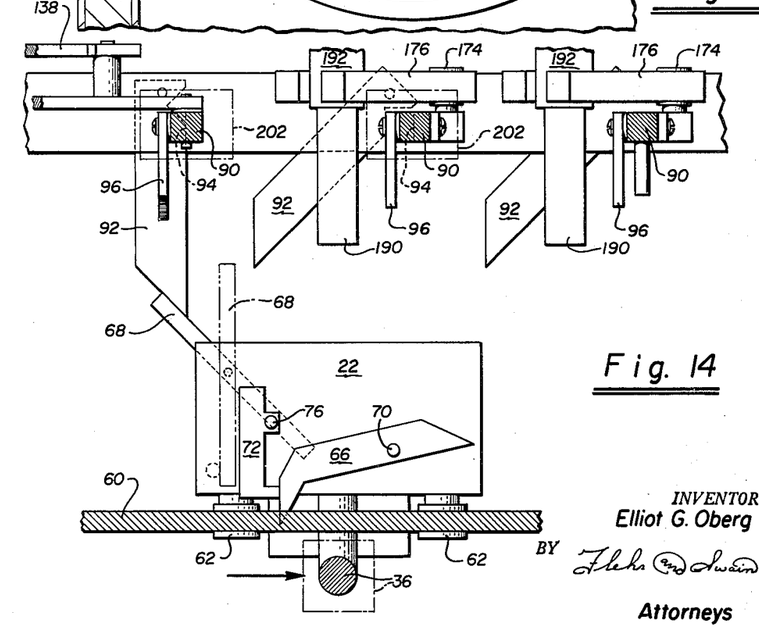
FIGURE 14 is an enlarged detail view in section, illustrating movement of the carriage mechanism and showing a particular stage in the operation of the machine.

Return movements of the carriage 22 are facilitated by free pivotal movements of the trip lever 68, in the return direction, as illustrated by the full line position of the trip lever in FIGURE 14.

*Cup dispensing (FIGURE 1).*—When the carriage is in position below the cup dispensing station 12, operation of the "cup" selector mechanism will cause a cup to drop into the receptacle 64 of the carriage. The cup dispenser itself, indicated generally at 100, can be of any conventional design including the operating lever 102. This lever can be engaged by a suitable extension 104 on the selector pull rod 90, when the latter is extended by the customer.

*Ice cream dispensing (FIGURES 9 to 11).*—Ice cream is dispensed at the station 14 by means of the rotary dispensing device 110 which has circumferentially spaced tubular openings 112 for the reception of ice cream. A solid cylinder of ice cream is positioned in each of the tubes 112 so as to be slidingly supported by the stationary plate 114 near the bottom of the dispensing device. The container itself is rotatably supported by the central shaft 116, and includes an upper rotatable portion 118 and a lower rotatable portion 120.

The entire dispensing device is preferably contained within a heavily insulated refrigeration box 122, provided with a lower opening 124 for the passage of ice cream. This opening can include a conduit 126 having a pivoted cover 128 to provide against refrigeration loss. As best seen in FIGURE 9, the conduit 126 can form part of a fixed cylindrical receiver 130 which guidingly supports both the rotatable container 110 and the fixed support plate 114 positioned between the upper and lower portions of the rotatable container. This construction permits the plate 114 to also serve as a cutter for the columns of ice cream, as will appear.

The plate 114 is provided with an opening 132 so that as the container 110 is rotated, a column of ice cream is allowed to fall through the opening and into the alined opening of the lower container portion 120. When the column of ice cream is subsequently rotated from the position at 134 to the position at 135, the blade edge 136 will act to slice off the lower portion of the column, allowing such sliced portion to pass into the opening 126. At the same time the cover 128 is pivoted to one side so that the sliced portion of ice cream can fall through the opening and into the waiting cup below.

Figure 10:
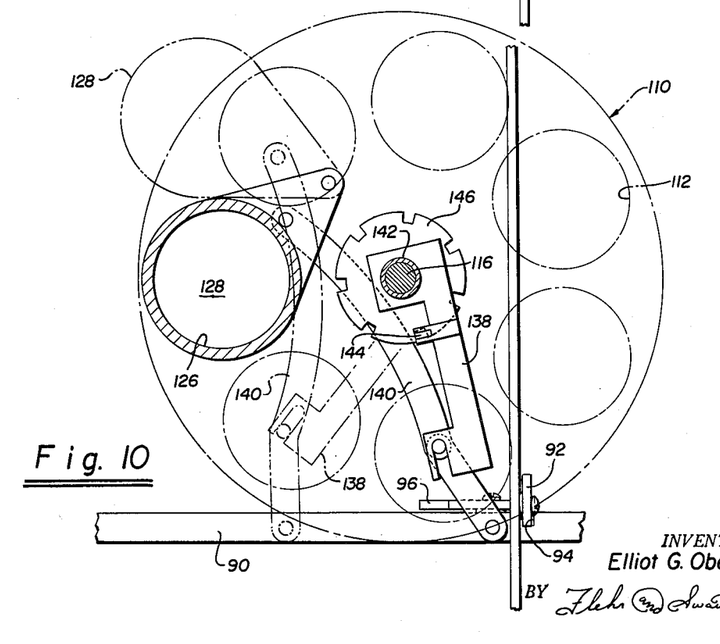
FIGURE 10 is a view in horizontal section along the line 10—10 of FIGURE 9.
Figure 11:
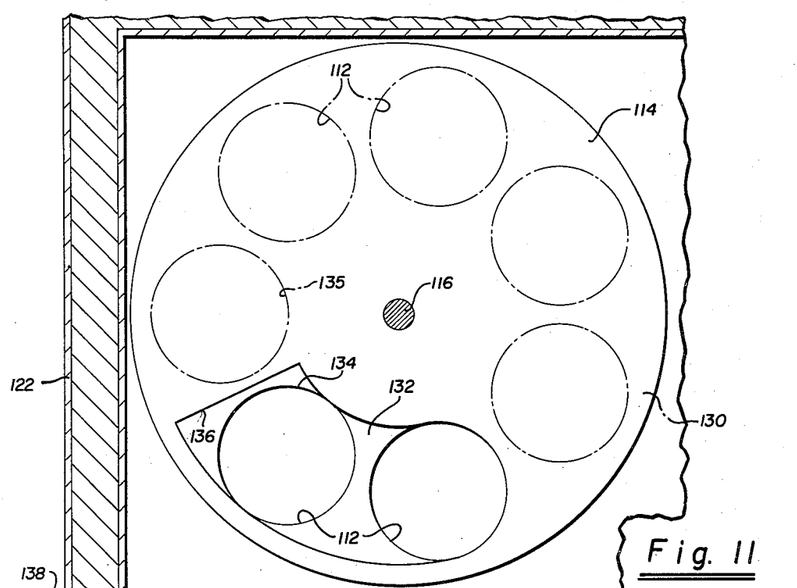
FIGURE 11 is a like view along the line 11—11 of FIGURE 9.

The selector mechanism for actuating the ice cream dispenser includes the pull rod 90, the radius arm 138, and the connecting lever 140. The latter has one end pivotally secured to the rod 90 and the other to the pivoted cover element 128 (FIGURE 10). The arm 138 is rotatably mounted on the shaft connector 142 and has a pivoted pawl 144 adapted to engage the ratchet wheel 146 splined to the shaft connector. Outward movement of the pull rod 90 will therefore cause the arm 138 to rotate the container to slice off a desired quantity of ice cream and at the same time open the cover 128 to permit discharge of the ice cream into the cup. The pawl 144 pivots out of the way on the return stroke of the selector rod so that the rotatable container maintains its position for the next paid operation.

*Milk dispensing (FIGURES 1 and 16).*—Milk is dispensed at station 16 by means of the snap action valve and hose assembly 150 including the T-shaped valve 152 and supply hose 154. In a closed position of the valve (illustrated) the hose is pinched against the valve housing 156, allowing milk from the container 158 to fill the loop portion 160 of the hose. Milk enters the hose at the container outlet 160 which is positioned above the assembly to provide a siphon action.

Figures 16, 17, 18, 19, 20:
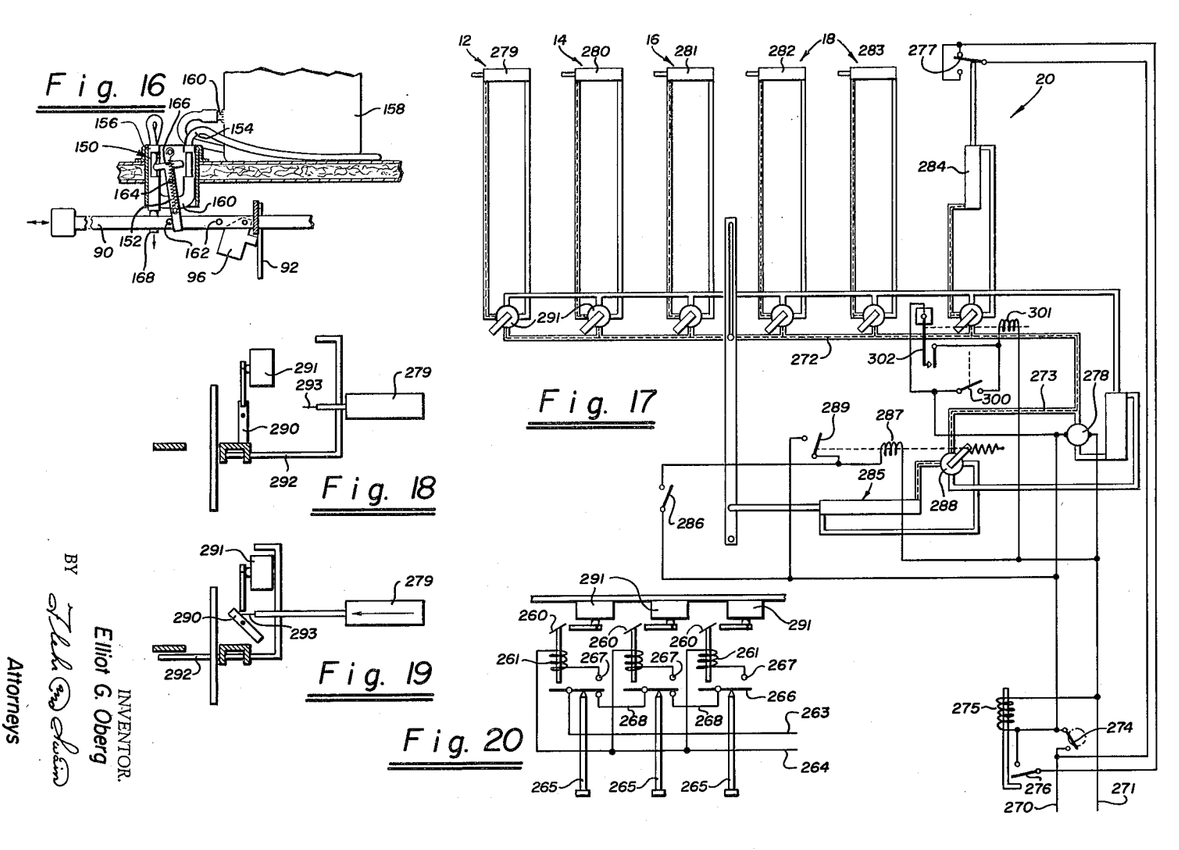
FIGURE 16 is a view in vertical section along the line 16—16 of FIGURE 1, showing one form of a milk dispensing mechanism.
FIGURE 17 is a schematic representation of a modified form of the machine adapted to automatic operation.
FIGURES 18 and 19 are detail views illustrating different operating positions of a directional tripping mechanism, suitable for use in the automatic machine of FIGURE 17.
FIGURE 20 is a schematic view of an automatic flavor dispensing mechanism suited for use with such machine.

Milk is dispensed by outward movement of the actuating knob 148 and selector pull rod 90, causing the inner stop 162 to engage the lower end of the valve 152 and to rotate it about the pivot at 164. As the lower end of the valve passes the center line, the spring 166 exerts a "snap action" which pinches the hose 154 against the opposite side of the valve housing. Milk in measured quantity is now permitted to flow through the hose outlet 168 into the cup below.

Upon subsequent return of the pull rod to its original position, the outer stop 162 operates to reverse the position of the valve 152. Milk now fills the loop 160 of the supply hose, in measured amount, in anticipation of the next cycle of operation.

*Flavor dispensing (FIGURES 12 and 13).*—Various flavors, such as vanilla, chocolate, strawberry, etc. are contained in the containers 170 at the flavor dispensing station 18. These flavors can similarly be dispensed into the cup by operation of the knobs 172. Outward movement of a knob and its associated pull rod 90 causes the roller 174 to rotate the bifurcated arm 176 in a clockwise direction to dispense a flavor, whereas inward movement will return the arm 176 to its original position and allow the flavor dispensing device 180 to refill with the liquid flavoring ingredients.

Referring to FIGURE 12, the device 180 is seen to consist of the liquid measuring chamber 182 and a tapered valve 184. The valve has a first passage 186 in communication with the main container 170 and a second passage 188 in communication with the discharge spout 190. The latter is preferably square in cross section so as to be rotatable with an outer sleeve 192 and with the bifurcated arm 176. The lower or connecting end 194 of the valve is also squared so that the valve will rotate with the arm 176, a quarter turn to the left and to the right.

Referring again to the FIGURE 12, the valve passages 186, 188 are provided with horizontal legs 198, 200 disposed at right angles to one another. Outward movement of the pull rod therefore causes the passage 200 to register with the passage 202 of the chamber 182, to discharge a measured quantity of flavoring ingredient into the cup. Inward movement of the pull rod similarly causes the passage 198 to register with the opening 204 so that a measured quantity of flavoring will again fill the chamber 192.

To insure a proper measure of the flavor, it is desirable that an air vent tube, such as the tube 206, be provided to extend into the main tank from the measuring chamber 182. It will be understood that any number of flavor containers 170 and dispensing units 180 can be provided.

*The mixing station (FIGURES 2, 3 and 15).*—The mixer 210 is mounted for vertical movements within the cabinet by means of the rotatable worm gear 212 operated by the motor 214. The motor 214 functions to rotate the gear 212 to cause the mixer blades 216 to descend through the aperture 218 into a mixing position within the carriage receptacle 64. The mixer motor is then actuated to thoroughly agitate and disperse the ice cream, milk and flavoring ingredients to produce a completed milk shake. Following mixing, the motor 64 is operated to return the mixer to its rest position, illustrated in the drawing.

Referring particularly to FIGURES 2 and 15, the mixing cycle is actuated by outward movement of the selector knob 220 which causes the pull rod and roller 222 to move the timer switch arm 224 clockwise to energize the timer. At the same time, the arm 224 acts to depress the switch 226 to energize the circuit for the motor 214 through the lines 228 and 230. Energization of the motor 214 immediately starts downward movement of the mixer carriage 232 causing the upper limit switch 234 to close. Consequently upon returning the selector knob to its original position, the motor 214 continues to be energized through the lines 230 and 236, even though the manual switch 226 is no longer closed. Inward movement of the pull rod also releases the timer arm 224 so that it can make its timed return to again close the switch 225.

The downward travel of the mixer eventually causes the mixer carriage 232 to first close the switch 238 to energize the mixer motor, and then to engage and open the lower limit switch 240. The circuit through line 236 is thus broken and the travel motor 214 de-energized.

At the end of the mixing cycle as determined by the timer 242, the switch 225 is again closed to energize the solenoid 244. This in turn closes the switch 246 and reverses the position of the switch 248, causing the motor 214 to receive current in a reversed direction through the lines 230 and 236, 250. As a result the mixer 210 is caused to move upward on the worm gear 212, releasing switch 238 to de-energize the mixer motor. Upward movement continues until the mixer carriage 232 again contacts and opens the upper limit switch 234, ending the mixing cycle.

As illustrated, the mixing chamber 252 is provided with suitable splash guards 254 and a vertically movable glass door 256. The door can be opened by the customer or attendant for purposes of removing the completed milk shake or for cleaning of the mixing chamber 252.

*Operation*

Reviewing briefly the operation of the machine, the customer first inserts a coin into the coin slot 26. The coin falling down the coin chute 42 trips the gravity lock 46 and releases the cup carriage 22 for movements through the ensuing operating cycle. The customer now grasps the lever 36 and moves the carriage to the left. This allows the coin to fall into the coin box 54. Continuing movement causes each of the gravity locks 92 to be engaged and released by the trip lever 68, freeing the various selector mechanisms for cups, ice cream, flavors, etc.

In an extreme left hand position of the carriage, the catch 72 is engaged by the stop 74 to drop the directional pawls 66 onto the apertured rails 60 (FIGURE 6). The carriage can now be moved only to the right through the subsequent dispensing and mixing operations. At the cup dispensing station 12, operation of the selector mechanism causes the pull rod 90 to engage the dispensing handle to discharge a cup into the receptacle 64 of the carriage.

The carriage can now be moved by the customer to a position under the ice cream dispensing station 14 and the selector knob and pull rod actuated to rotate the ice cream container past the blade 136 to slice off a portion of ice cream. At the same time the pivoted door 128 is opened to permit the sliced portion of ice cream to fall into the cup below. The carriage is next moved to a position below the milk dispensing station 16, and the pull rod actuated to open the snap acting pinch valve 152. A measured quantity of milk, as determined by the section of tubing 160, is then discharged into the cup. Upon returning the pull rod to its initial position, the pinch valve closes, allowing the section of tubing to refill with the desired quantity of milk necessary for the next operation.

The carriage is now moved under one of the various containers 170 at the flavor dispensing station 18. Pulling of a selector knob 172 and its pull rod causes a flavor valve 184 to be rotated 90° to discharge the flavor contents of the chamber 182 through the passage 188. Returning the selector rod to an in position returns the valve 184 to its initial position allowing the chamber 182 to again fill with flavoring ingredient through the passage 186.

The carriage 22 is next moved to a position beneath the mixer 210, and the selector knob 220 pulled to energize the electric-timer-control system for the mixer at the station 20. As previously described, the motor 214 is energized to cause downward movement of the mixer on the worm gear 212 into a mixing position within the cup. The timer is simultaneously energized. In a lowered positon of the mixer, the mixer motor is energized through the switch 238, and mixing continues until the end of the timed cycle. At such time, the timer closes the reversing switches 246, 248 to energize the motor returning the mixer to its raised positon. Upward movement of the mixer allows the switch 238 controlling the mixer motor to open so that unnecessary splashing is avoided. Upon reaching its upper position, the travel motor 214 is de-energized by actuation of the limit switch 234.

The customer can now raise the door 256 by means of the handle 40 and remove a completely mixed milk shake of desired flavor. Since movement of the carriage 22 to the final mixing position causes the stop 80 to lock the directional pawl 66 in a raised position, the carriage 22 is properly positioned for a subsequent complete cycle of the machine.

*Automatic operation (FIGURES 12–20).*—The machine of the present invention due to its design lends itself equally well to either the manual operation described above or to completely automatic operation. The various stations of the machine, including the dispensing stations and the mixing stations, all are capable of functioning in substantially the same manner, in either a manually operated or fully automatic machine. Only the manner of selection of flavors, and the operation of the various locks is changed.

FIGURES 17 to 20 illustrate one form of a machine suitable for automatic operation. The automatic cycle is initiated by insertion of the coin into the coin slot 26 as before. However, the gravity lock 46 functions upon being pivoted to one side by the coin, to close a holding circuit in the main power supply to initiate the automatic operation.

Referring specifically to FIGURE 17, 274 indicates the switch closed by the coin. This switch energizes the solenoid 275 through the lines 270 and 271 to the main power supply. The solenoid 275 in turn closes a holding circuit through switch 276 which acts to energize the fluid motor 278 which supplies pressure to the hydraulic system for automatic operation. Fluid pressure is now supplied through the main pressure lines, indicated by the lotted lines 272 and 273 in FIGURE 25, until such time as fluid flow is reversed by the reversing valve actions to be described.

As is shown in FIGURE 17, the actuating cylinder 279 for the cup dispensing station, the cylinder 280 for the ice cream dispensing station, a cylinder 281 for the milk dispensing station, the cylinders 282, 283, etc. for the flavor dispensing units, and the cylinder 284 for the mixing station, are positioned in an initially inoperative position. As in the principal embodiment previously described, each of these cylinders is provided with reversing valve means adapted to be actuated by a directional tripping lever carried by the carriage 22, during its return movement.

The carriage and its station actuator 285 are moved to the left by the fluid pressure in line 273. When the carriage actuator 285 reaches the extreme left position of travel, it closes switch 286, energizing solenoid 287 to reverse the position of the spring loaded valve 288, and consequently the direction of travel of the carriage and actuator 285. At the same time, the switch 289 is closed so that the solenoid 287 continues to be energized despite the opening of switch 286 by the right movement of the actuator 285.

FIGURE 18 illustrates the directional tripping lever 290 which is adapted to engage the spring loaded reversing valves 291 on the various actuating cylinders 279 to 284. As the carriage moves to the right, the tripping lever 290 comes into contact with each of the reversing valves to energize the cylinder at a particular station. Thus, as illustrated in FIGURE 18, the tripping lever 290 is shown initiating operation of the actuating cylinder 279 by engagement with the valve operator for the valve 291. Movement of the piston of the actuating cylinder 279 functions to operate the cup dispenser in the manner previously described. At the end of its stroke, the tripping bar 293 of the piston strikes the directional tripping lever 290 rotating it clear of the spring valve 291, thus allowing the valve to return to its original position for subsequent actuation in a later cycle.

FIGURE 19 illustrates the operation of the actuating cylinders in momentarily blocking the movement of the cup carriage along its track. This is accomplished by an arm 292 attached to the pistons of the actuating cylinders, and adapted to extend into a position in front of the cup carriage 22 during operation of an actuating cylinder. It will be understood that as the tripping bar 293 rotates the tripping lever 290 of the spring loaded valve operator, the valve is enabled to return to its normal position. This in turn causes the piston of the actuating cylinder to withdraw, and to remove the arm 292 from its blocking position in front of the cup carriage. As the operation just described is the same at each actuating cylinder in the series 279 to 284, no further description is necessary for the succeeding stations 14 to 18. A different actuation is necessary at the mixing station 20, as will be described.

From the foregoing, it will be apparent that as the carriage moves through the successive stations, it will actuate the particular dispensing mechanism to discharge a measured quantity of ice cream, milk and flavoring ingredient. However, to prevent the carriage from automatically causing more than one flavor to be dispensed, an automatic flavor selection mechanism can be employed as illustrated in FIGURE 20. As there shown, each dispensing unit at the station 18 is provided with a deflector unit 260 adapted to prevent the directional tripping lever 290 from rotating the valve operators for the spring loaded valves 291. Each of these deflector units in turn forms part of a solenoid 261 positioned in the circuit formed by the lines 263, 264. If no customer selection were made by depressing one of the levers 265, the cup would move through the flavor dispensing station without any flavor ingredients being dispensed therein. However, upon depressing one of the levers 265, a solenoid 261 is energized to move the deflector unit 260 away from its deflecting position in front of a flavor valve operator. This could be accomplished by manual throw of a switch 266 to a position in contact with a pole 267. At the same time, the circuit through the lines 268 to subsequent switches 266 would be broken so that no flavor selection could be made.

Although not specifically illustrated in connection with FIGURE 17, the operator for the spring loaded reversing valve 291 used in connection with the actuating cylinder 284 (mixing station) is recessed so that no contact with the directional tripping lever 290 is possible. Instead, the cup carriage acts to momentarily close the switch 300 to energize the solenoid 301. This solenoid functions to reverse the valve 291 for the mixer and at the same time closes the switch 302 for the timer. This latter switch remains closed throughout the timing cycle. The mixer 210 can now move into mixing position within the cup receptacle in the manner previously described.

At the end of the time period, the switch 302 is opened, de-energizing the solenoid 301, and allowing the spring loaded valve 291 to return to its normal position, and hence the actuating cylinder 284. As the piston of the actuating cylinder reaches the top of its travel, it operates to momentarily open the switch 277 to de-energize the holding solenoid 275. The switch 276 now opens to de-energize the entire control mechanism. Opening the switch 276 also de-energizes the solenoid 287 allowing the spring loaded valve 288 to return to its normal position.

The machine is now in position for the next paid operation, following removal of the completed ice cream drink through the window 256.

While the present invention has been illustrated and described in connection with preferred embodiments thereof, it is capable of other variations and modifications within the scope of the claims appended hereto.

I claim:

1. In a coin-operated milk shake vending machine, a housing, means refrigerating the interior of said housing, a plurality of containers mounted in said housing, said containers being adapted to separately receive cups, ice cream, milk and flavoring ingredients, a mixing and beating device including an agitator mounted for vertical movements within said housing, said agitator including a plurality of rotary cutting and mixing blades, a power source for operating and moving said device, dispensing means disposed adjacent to each of said containers, a carriage including a cup receptacle mounted for movements between successive positions beneath said dispensing means and said mixing and beating device, and coin-actuated means energizing said carriage, each of said dispensing means, and the power source for said mixing and beating device, whereby insertion of a coin into the machine permits the dispensing of all of the ingredients and the thorough agitation and blending necessary for the making of a vendable milk shake.

2. A device as in claim 1 together with individual rod means connected with each said dispensing means for successive manual operation of the dispensing means.

3. A device as in claim 1 together with switch means coupled with said power source, said switch means being connected to an operating rod for manual actuation of said power source.

4. A device as in claim 1 together with control means operably connected to said dispensing means and said mixing device automatically controlling the operation of said dispensing means and said mixing device.

5. A device as in claim 4 together with means coupled to said control means for automatically timing said control means.

6. A device as in claim 1 wherein said container for ice cream is rotatable, and said ice cream dispensing means includes a cutting blade and a series of rotatable arms adapted to dispense a predetermined portion of ice cream into a cup.

References Cited in the file of this patent

UNITED STATES PATENTS

| | | |
|---|---|---|
| 1,180,344 | Valentine | Apr. 25, 1916 |
| 1,382,141 | Stickels | June 21, 1921 |
| 1,791,611 | Borchert | Feb. 10, 1931 |
| 2,353,080 | Richmond | July 4, 1944 |
| 2,685,393 | Thompson | Aug. 3, 1954 |
| 2,855,007 | Erickson et al. | Oct. 7, 1958 |